United States Patent
Koutsimanis et al.

(10) Patent No.: US 9,769,761 B2
(45) Date of Patent: Sep. 19, 2017

(54) METHOD AND APPARATUS FOR UPLINK POWER CONTROL IN A RADIO COMMUNICATION NETWORK

(71) Applicant: Telefonaktiebolaget LM Ericsson (publ), Stockholm (SE)

(72) Inventors: Chrysostomos Koutsimanis, Stockholm (SE); Panagiota Lioliou, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/125,478

(22) PCT Filed: Mar. 13, 2014

(86) PCT No.: PCT/SE2014/050308
§ 371 (c)(1),
(2) Date: Sep. 12, 2016

(87) PCT Pub. No.: WO2015/137856
PCT Pub. Date: Sep. 17, 2015

(65) Prior Publication Data
US 2017/0078974 A1    Mar. 16, 2017

(51) Int. Cl.
H04W 52/14    (2009.01)
H04W 52/02    (2009.01)
H04W 72/04    (2009.01)
H04W 52/24    (2009.01)
H04W 52/28    (2009.01)

(52) U.S. Cl.
CPC ..... *H04W 52/146* (2013.01); *H04W 52/0251* (2013.01); *H04W 52/242* (2013.01); *H04W 52/283* (2013.01); *H04W 72/0433* (2013.01); *H04W 52/243* (2013.01)

(58) Field of Classification Search
CPC .. H04W 52/146; H04W 52/243; H04B 7/024; H04B 7/0452
See application file for complete search history.

(56) References Cited

U.S. PATENT DOCUMENTS

| 2009/0093281 A1* | 4/2009 | Demirhan | H04W 52/0235 455/574 |
| 2011/0034206 A1* | 2/2011 | Venkatraman | H04B 7/0452 455/522 |

(Continued)

OTHER PUBLICATIONS

Unknown, Author, "Transmission Power Control in E-UTRA Uplink", 3GPP TSG RAN WG1 Meeting #48, R1-070870, S1. Louis, USA, Feb. 12-16, 2007, 1-8.

(Continued)

*Primary Examiner* — Bobbak Safaipour
(74) *Attorney, Agent, or Firm* — Murphy, Bilak & Homiller, PLLC

(57) ABSTRACT

An apparatus and a method performed by the apparatus for uplink power control of a wireless device in a radio communication network is provided. The method comprises obtaining (110) information pertaining to at least two of (a) radio resource utilisation of a serving wireless access point and at least one neighbouring wireless access point, (b) downlink geometry, and (c) uplink performance of the wireless device; and selecting (130) an uplink power control algorithm based on the obtained information.

20 Claims, 8 Drawing Sheets

| | Resource utilisation in neighbour wireless access point (WAP) | | |
|---|---|---|---|
| Resource utilisation in serving WAP | Low load | Medium load | High load |
| Low load | Single cell pathloss | Single cell pathloss | Single cell pathloss |
| Medium load | Multi-cell load | Single cell pathloss | Single cell pathloss |
| High load | Multi-cell load | Multi-cell load | Single cell pathloss |

Table 1

(56) References Cited

U.S. PATENT DOCUMENTS

| | | | |
|---|---|---|---|
| 2012/0026896 A1 | 2/2012 | Li et al. | |
| 2012/0287876 A1* | 11/2012 | Kazmi | H04B 7/022 370/329 |
| 2013/0308473 A1* | 11/2013 | Sun | H04W 36/30 370/252 |
| 2016/0021618 A1* | 1/2016 | Yin | H04W 52/146 370/280 |
| 2016/0374030 A1* | 12/2016 | Koutsimanis | H04W 52/343 |

OTHER PUBLICATIONS

Unknown, Author, "Uplink Power Control for E-UTRA", 3GPP TSG RAN1 #48, R1-070795, Motorola, St. Louis, USA, Feb. 12-16, 2007, 1-4.

* cited by examiner

| | Resource utilisation in neighbour wireless access point (WAP) | | |
|---|---|---|---|
| Resource utilisation in serving WAP | Low load | Medium load | High load |
| Low load | Single cell pathloss | Single cell pathloss | Single cell pathloss |
| Medium load | Multi-cell load | Single cell pathloss | Single cell pathloss |
| High load | Multi-cell load | Multi-cell load | Single cell pathloss |

Fig. 2a: Table 1

|  | Resource utilisation in neighbour wireless access point (WAP) | | |
|---|---|---|---|
| Resource utilisation in serving WAP | Low load | Medium load | High load |
| Low load | Single cell pathloss | Multi-cell geometry | Multi-cell geometry |
| Medium load | Multi-cell load | Single cell pathloss | Multi-cell geometry |
| High load | Multi-cell load | Multi-cell load | Single cell pathloss |

Fig. 2b: Table 2

|  | Resource utilisation in neighbour wireless access point (WAP) | | |
|---|---|---|---|
| Resource utilisation in serving WAP | Low load | Medium load | High load |
| Low load | Multi-cell geometry | | |
| Medium load | | | |
| High load | | | |

Fig. 2c: Table 3

|  | Resource utilisation in neighbour wireless access point (WAP) | | |
|---|---|---|---|
| Resource utilisation in serving WAP | Low load | Medium load | High load |
| Low load | Single cell pathloss | Single cell pathloss | Single cell pathloss |
| Medium load | Multi-cell load | Single cell pathloss | Single cell pathloss |
| High load | Multi-cell load | Multi-cell load | Single cell pathloss |

Fig. 2d: Table 4

| Battery life of wireless device | |
|---|---|
| Low level | High level |
| Single cell pathloss | Follow tables 1-4 |

Fig. 2e: Table 5

METHOD AND APPARATUS FOR UPLINK POWER CONTROL IN A RADIO COMMUNICATION NETWORK

TECHNICAL FIELD

The present disclosure relates to transmission power control in uplink in a radio communication network.

BACKGROUND

This disclosure relates to the area of Uplink Power Control, UL PC. UL PC is relevant for several different Radio Access Technologies, RATs. The solutions described herein will be exemplified with regards to Long Term Evolution, LTE, wireless networks but the solutions are applicable to other types of wireless communication networks or RATs as well.

In wireless communication networks, the UL is typically a challenging link, where the available scarce energy of a wireless device, e.g. a User Equipment, UE, must be used to compensate for the losses of the channel (distance dependent pathloss, shadow fading, fast fading, etc.). Moreover, the interference produced by any UL transmissions in a multi-cell environment is also another limiting factor for the UL performance. One way to use efficiently the available energy at the UE is to control the UL transmit power. UL power control can be used on both data and control channels.

UL power control in LTE is a topic discussed earlier and part of already the first $3^{rd}$ Generation Partnership Project, 3GPP, LTE standard release, i.e. Rel. 8. According to the standardised method, UL PC is typically based on compensating the pathloss to the connected cell. For example, a UE which is close to the BS will use less transmit power than a UE which is close to the cell edge. This power control principle does not take into account any impact of the selected transmit power on surrounding (or interfered) cells.

The UL power control may become even more intricate in heterogeneous networks, where different wireless access points of different downlink transmission powers are employed. The size of the respective coverage areas, also referred to as cells, for wireless access points of different downlink transmission powers may vary substantially and also the total number of UEs, the density (i.e. the number of UEs per area unit of a cell) may vary substantially. Uplink power control in such heterogeneous networks plays an important role: it balances the need for sufficient transmit power to maintain the required Quality-of-Service, QoS, against the need to control inter-cell interference and maximise the UE battery life.

In achieving this goal, an efficient power control algorithm should adapt to the characteristics of the radio propagation channel by taking into account path-loss or geometry conditions as well as overcoming interference from other users in neighbouring cells. The downlink geometry gives an indication of an experienced radio position of the wireless device with respect to the serving wireless access point and at the least one neighbouring wireless access point. The downlink geometry may be expressed as a ratio of received useful signal over received interfering signal.

In LTE, uplink power control is a combination of two terms: a basic open loop operating point for compensating for slow changes in pathloss, and a closed loop mechanism consisting of explicit control commands transmitted in the downlink for user specific power adjustments.

In single-cell configurations, the parameters that define an open loop operating point are set by utilising information related only to the serving wireless access point. The most common single-cell configurations is the pathloss-based power control method, which is also the $3^{rd}$ Generation Partnership Project, 3GPP, baseline, and the load based power control method. The parameters that define the open loop operating point are set by utilizing information related only to the serving cell.

According to 3GPP, the transmit power target per resource block (PRB) for PUSCH transmission can be evaluated as $PSD_{TX}=P_0+\alpha PL+\delta_{CL}$, where $P_0$ is the received power target (user or cell specific), α is the path-loss compensation factor (cell specific), PL is the downlink path-loss measured by the UE and $\delta_{CL}$ is the closed loop component.

The fractional path-loss compensation factor α is a cell-specific parameter that can be seen as a tool to control the trade-off between cell-edge data rate and total uplink capacity. Uplink power control with α=1 corresponds to full pathloss compensation. Full path-loss compensation maximizes fairness for cell-edge wireless devices by adjusting the UL power so that the received power remains constant. On the other hand, by setting α<1 a wireless device compensates only a fraction of pathloss when setting the transmit power. In this way, fractional pathloss compensation, FPC, may improve the total system capacity in the uplink by assigning relatively lower transmit power to the terminals close to the cell border (higher path-loss), so that cell-edge wireless devices cause less inter-cell interference. Typically, path-loss compensation factors around 0.8 have been shown to give a close-to-optimal uplink system capacity without degrading significantly the cell-edge data rate.

Since the parameters $P_0$ and α determine the open loop operating point, they can be used by the operator to control the uplink power. Therefore, different choices of the parameters $P_0$ and α can lead to different UL power control configurations.

An assumption in Fractional Power Control, FPC, is that UEs with low pathloss can increase their transmit PSD without causing too much interference. However, this assumption is only valid in homogeneous scenarios. For example, in scenarios with mixed indoor and outdoor users, increasing the power of an outdoor UE with relatively low pathloss can cause strong interference to a neighbouring indoor UE that has relatively high pathloss. In this case, it is highly possible that the indoor UE becomes power limited when it is close to the cell border and has no power to boost Signal to Interference and Noise Ratio, SINR.

An idea behind single-cell load based power control is to set the received power target in each cell, i.e. coverage area of a wireless access point, proportional to the number of wireless devices. Hence, higher uplink targets are used in cells with high load and load balancing between the cells may be achieved. Load-based power control can be combined with full and fractional pathloss power control. The UE transmit PSD target can then be expressed as $PSD_{TX}=P_0+\alpha PL+10\log_{10} N+\delta_{CL}$, where N is the number of users per cell. The number of users per cell can be directly mapped to the mean cell utilization by using the following expression $$N = \frac{\text{radio resource utilisation}}{1 - \text{radio resource utilisation}} + 1.$$

In multi-cell configurations, the open loop operating point may be set by combining information from the serving and neighbouring wireless access points. Therefore, these schemes require more information and processing with respect to the single cell approach. Geometry-based power control (also known as interference aware power control) is the most common multi-cell configuration. In this method, the output power of each wireless device is set by taking into account the downlink gain geometry. The gain geometry is a useful measure of the amount of interference generated by a specific user and can be evaluated as $G = \text{lin}(-PL_{BS}) / \Sigma_{i \neq BS} \text{lin}(-PL_i)$, where $PL_{BS}$ is the pathloss between the wireless device and the serving wireless access point and $PL_i$ is the pathloss between the wireless device and its neighbouring wireless access point i (in linear scale). Hence, high gain geometry suggests low interference to neighbouring wireless access point, while low geometry suggests high interference to neighbouring wireless access point. After combining interference aware power control with pathloss-based power control, the transmit PSD target of each wireless device may be calculated by the following expression $PSD_{TX} = P_0 + \alpha PL + kG + \delta_{CL}$, where k is a geometry proportional factor.

A wireless communication system employing the uplink power algorithm described above, may be efficient for determining an uplink transmission power compensating for at least a fraction of the pathloss. It is possible to determine how large a fraction of the pathloss should be compensated for by setting a corresponding value of $\alpha$. Such a power algorithm may facilitate optimisation of certain characteristics in a coverage area of a wireless access point, e.g. interference situation or throughput. However, what is favourable in one coverage area of a first wireless access point may generate a bad situation in a neighbouring coverage area of a neighbouring second wireless access point.

Consequently, the overall system performance in e.g. two or three neighbouring coverage areas of corresponding wireless access points may be less than optimal if consideration is taken in each coverage area only to circumstances in that coverage area.

SUMMARY

The object is to obviate at least some of the problems outlined above. In particular, it is an object to provide an apparatus and a method performed by the apparatus for uplink power control of a wireless device in a radio communication network. These objects and others may be obtained by providing an apparatus and a method performed by an apparatus according to the independent claims attached below.

According to an aspect a method for uplink power control of a wireless device in a radio communication network is provided. The method comprises obtaining information pertaining to at least two of (a) radio resource utilisation of a serving wireless access point and at least one neighbouring wireless access point, (b) downlink geometry, and (c) uplink performance of the wireless device; and selecting an uplink power control algorithm based on the obtained information.

According to an aspect, an apparatus adapted for uplink power control a wireless device in a radio communication network is provided. The apparatus comprises a processor and a memory, the memory comprises instructions which when executed by the processor causes the apparatus to: obtain information pertaining to at least two of (a) radio resource utilisation of a serving wireless access point and at least one neighbouring wireless access point, (b) downlink geometry, and (c) uplink performance of the wireless device; and to select an uplink power control algorithm based on the obtained information.

The method and the apparatus may have several advantages. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The solution may be implemented as a proprietary feature. Still further, the solution may be part of Self Organising Network, SON, algorithms.

BRIEF DESCRIPTION OF DRAWINGS

Embodiments will now be described in more detail in relation to the accompanying drawings, in which:

FIG. 2*a* is table 1, illustrating an exemplifying uplink power configuration for wireless devices where downlink geometry is below a geometry threshold and the uplink performance is below a performance threshold.

FIG. 2*b* is table 2, illustrating an exemplifying uplink power configuration for wireless devices where downlink geometry is above the geometry threshold and the uplink performance is below the performance threshold.

FIG. 2*c* is table 3, illustrating an exemplifying uplink power configuration for wireless devices where downlink geometry is above the geometry threshold and the uplink performance is above the performance threshold.

FIG. 2*d* is table 4, illustrating an exemplifying uplink power configuration for wireless devices where downlink geometry is below the geometry threshold and the uplink performance is above the performance threshold.

FIG. 2*e* is table 5, illustrating an exemplifying uplink power configuration for wireless devices with a secondary condition.

DETAILED DESCRIPTION

Figure 1A:
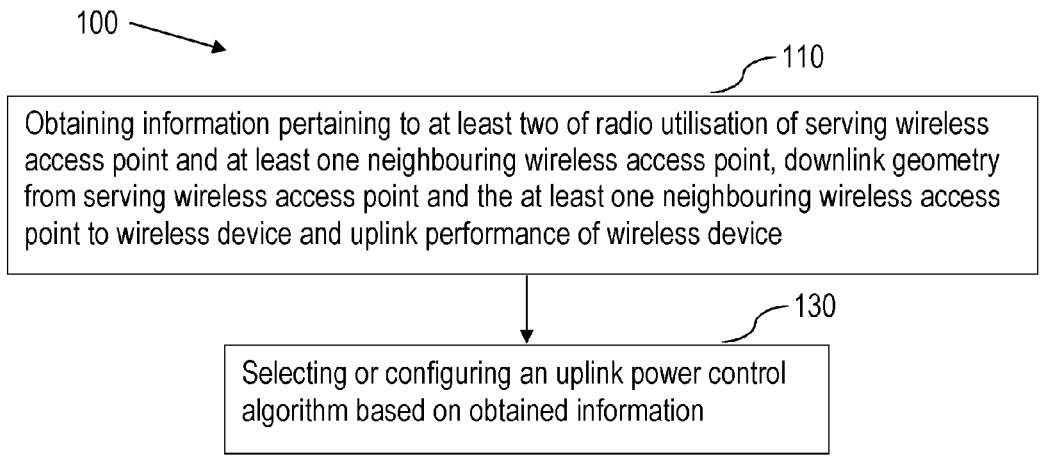
FIG. 1*a* is a flowchart of a method for uplink power control of a wireless device in a radio communication network according to an exemplifying embodiment.

Briefly described, an apparatus and a method performed thereby for uplink power control in a radio communication network are provided. The apparatus can be a wireless device and/or a wireless access point, and hence the method may be performed by a wireless device and/or a wireless access point. Non-limiting examples of a wireless device are a UE, a mobile telephone, a laptop, a personal digital assistant or any other device comprising means for wireless communication with a communication network via an access point. Non-limiting examples of wireless access points are a Radio Base Station, RBS, an eNodeB, a Base Station, a Base Station Controller, and a Radio Network Controller.

The apparatus and the method performed by the apparatus for uplink power control of a wireless device in a radio communication network takes into account several different factors in addition to the load and interference situation in the cell, i.e. a coverage area of a RBS by which a wireless device is being served, when determining an uplink transmission power for the wireless device. It shall be pointed out that an RBS may have more than one cell so that a cell is one of possibly several coverage areas of the RBS.

The method for uplink power control a wireless device in a radio communication network comprises evaluation of a plurality of criteria based on which the uplink power control is configured. The configurations are divided into two groups, namely single-cell or Type-1 and multi-cell or Type-2. In the first group, configuration is based on information available locally to the serving wireless access point so there is no need for inter-cell measurements or any information exchange among neighbour wireless access points. In the second group, the power control configuration requires knowledge from the neighbour wireless access points as well, so inter-cell measurements and information exchange among wireless access points is required. As stated above, the different uplink power control algorithms are Type 1: 3GPP baseline uplink power control. A power target $P_0$ is set independently of wireless device radio position or performance and serving cell load, i.e. radio resource utilisation of the serving wireless access point; Type 2A: The uplink power control becomes user-specific and takes into account the downlink geometry of a wireless device. A correction factor may be added to the power target $P_0$ thus allowing wireless devices with high geometry to have higher power target; and Type 2B: The uplink power control takes into account the load of not only the serving wireless access point, but also the surrounding wireless access points. A correction factor may be added to the power target $P_0$ thus allowing to increase the power target when load imbalances occur between wireless access points.

Also as described above, the method may be performed by, or be implemented in, a wireless access point and/or a wireless device. In the first case, the wireless access point receives information from the connected wireless device and neighbour wireless access points, evaluates a number of criteria and decides on the power control configuration. This method is completely agnostic to the wireless device and no standardisation change is needed. In the second case, the wireless device receives information from the wireless access point (e.g. the serving wireless access point). Information may also include assistance information for the baseline power control (network node signals the baseline power control parameters corresponding to Type 1). Upon receiving that information, the wireless device evaluates a number of criteria and decides on how to further configure the uplink power control algorithm. This method may require additional signalling from the wireless access point to the wireless device and hence may require change in the standard. In an example, the UE may report the configuration back to the network node allowing closed-loop operations and further improvement of the uplink power control configuration. In yet another way, the method may be implemented in both wireless access point and the wireless device. The wireless access point, based on received information may evaluate a number of criteria and propose to the wireless device a set of recommended configurations. Then the wireless device, based on locally available information may decide on which configuration matches its conditions and select one from the proposed set. This method may require changes in the standard, since multiple power control configurations may be signalled to the wireless device.

Radio resource utilisation refers to the average resource utilisation of a wireless access point in the uplink direction. The radio resource utilisation is a metric that indicates the ratio of time-frequency resources used to carry the offered traffic during a time period over the available time-frequency resources of that period. An example of time-frequency resources in LTE may be a Physical Resource Block, PRB. Typically, resource utilisation is defined in percentage values. For example, an average resource utilisation of 10% means that in average 10% of the available resources are occupied in order to serve the amount of offered traffic by the connected wireless devices. Resource utilisation captures resource usage for carrying both data, (Physical Uplink Shared Channel, PUSCH) and control type (Physical Uplink Control Channel, PUCCH) of information. Each wireless access point may determine, e.g. by calculating or measuring, the radio resource utilisation over a certain time period. This time period can be from one up to several radio frames, where each radio frame in LTE terminology corresponds to 10 msec. Each wireless access point may also predict the average resource utilisation for a future time period. This can be made by utilising information on the performance of the connected wireless devices, their traffic generation patterns and their buffer status. If such a prediction is available, the resource utilisation may be calculated as a weighted average (e.g. by time filtering) of past and future values. The determined radio resource utilisation can also be expressed in terms of N discrete levels. In an example, where N=3, a low, medium and high level may be used. In a yet another example, low level may correspond to utilisation lower to 10%, medium level may correspond to a utilisation level above 10% and below 60%, and a high level may correspond to a utilisation level of above 60%. The utilisation values or levels are an indication of how much loaded each wireless access point is. Hence a utilisation value of 80% indicates a wireless access point with a lot of carried traffic and typically long queuing times. Once each wireless access point has calculated the average radio resource utilisation values or levels, exchange of those values or levels among neighbour wireless access point may take place. This information may be exchanged through standardised inter-cell interfaces, such as the X2 in LTE. Out of all neighbour wireless access points, information exchange may occur only among wireless access points that are of interest. For example, the wireless device measures the signal strength of the surrounding wireless access points and then it may figure out which wireless access point or wireless access points will get most disturbed from its uplink transmissions. In that case, the wireless device may signal the cell IDs of those wireless access points to the serving wireless access point and then the serving wireless access point might request the average utilisation of this specific set of wireless access points. In another example, the wireless device might signal the set of measured wireless access points along with their signal strength to the serving wireless access point and then the serving wireless access point may decide from which wireless access points a request for the utilisation value should be sent. For example, if the signal strength of a neighbour wireless access point is above a predefined threshold, then the neighbour wireless access point is included in the list of interest. In case of multiple neighbour wireless access points are selected, the average neighbour wireless access point utilisation may be determined based on a statistical function e.g. mean of the average utilisation in all neighbour wireless access points of interest, or the Xth percentile of the average utilisation in all neighbour wireless access points of interest, etc.

Downlink geometry refers to the experienced radio position of a wireless device with respect to the serving and neighbour wireless access points. The downlink geometry may comprise not only the Euclidean distance to the serving and neighbour wireless access points but also other large scale fading components, such as shadow fading. It is defined as the ratio of downlink received signal strength from the serving wireless access point over the sum of downlink received signals strength from neighbour wireless access points including also the thermal noise at the wireless device receiver. The downlink geometry is an indication of how well isolated the wireless device is with respect to the surrounding wireless access points. A high downlink geometry means that the wireless device is located quite close to the serving wireless access point while it is far from the neighbour wireless access points. This also means that in the uplink direction, the specific wireless device may produce less interference to the surrounding wireless access points when it is transmitting uplink data. On the other hand, a low downlink geometry indicates a wireless device close to the cell border which means that the wireless will potentially produce high interference to the surrounding wireless access points when transmitting data on the uplink. The downlink geometry may be calculated at the wireless access point or at the wireless device side. In an example, the geometry may be calculated as the ratio of the Reference Signal Received Power, RSRP, measurements that the wireless device is performing for mobility reasons. The ratio of the serving wireless access point RSRP over the sum of RSRP received from surrounding wireless access points including the thermal noise is equal to the downlink geometry.

Uplink performance of the wireless device refers to the experienced wireless device performance in the uplink. It may be defined as the average wireless device throughput in the uplink. The wireless access point may define the average wireless device throughput by dividing the amount of received data over the transmission time. Another example of defining the wireless device performance is through the used modulation and coding schemes, MCS, for the data transmissions as well as the reported acknowledgements, ACKs, for the received packets. A wireless device which uses in the majority of time high MCS and high ACK ratio then it can be considered to have a high uplink performance. The wireless device performance can also be expressed in K discrete levels. In an example, where K=2, a high-performing and a low-performing wireless device can be considered. A low-performing wireless device can be a wireless device with an average throughput below a certain threshold. This threshold can be a value lower or X % above to the minimum required throughput for maintaining a specific Quality of Service, QoS. In another example, a low performing wireless device can be a wireless device with performance equal to X % of the maximum achievable wireless device throughput. In another example, a wireless device can be a low-performing wireless device if the experienced uplink Signal to Interference and Noise Ratio, SINR, or other measurements (such uplink Sounding Reference Signal, SRS, strength) are below a certain threshold. On the other hand, a high-performing wireless device can be a wireless device with an uplink performance close to the maximum achievable uplink performance. In another example, a wireless device can be high-performing wireless device if the experienced uplink SINR or other measurements (such uplink SRS strength) are above a certain threshold. In yet another example, if a wireless device uses high MCS over a consecutive time period and has high ACK ratio (successfully received packets), then it may be considered as a high-performing wireless device.

FIG. 2a is table 1, illustrating uplink power configuration for wireless devices where downlink geometry is below a geometry threshold and the uplink performance is below a performance threshold.

FIG. 2b is table 2, illustrating uplink power configuration for wireless devices where downlink geometry is above the geometry threshold and the uplink performance is below the performance threshold.

FIG. 2c is table 3, illustrating uplink power configuration for wireless devices where downlink geometry is above the geometry threshold and the uplink performance is above the performance threshold.

FIG. 2d is table 4, illustrating uplink power configuration for wireless devices where downlink geometry is below the geometry threshold and the uplink performance is above the performance threshold.

FIG. 2e is table 5, illustrating uplink power configuration for wireless devices with a secondary condition.

As previously described above, the method comprises in an embodiment, evaluating different factors, or metrics, against different thresholds. FIGS. 2a-2e illustrates examples of which uplink power control algorithm to select, or equivalently, how to configure the uplink power control algorithm based on the circumstances regarding the radio resource utilisation of a serving wireless access point and at least one neighbouring wireless access point, the downlink geometry, and the uplink performance of the wireless device.

The wireless access point, or the wireless device, may assess each condition, or at least two of them, and may then use a mapping corresponding to the tables to define the uplink power control algorithm configuration strategy. For example, when a wireless device has low uplink performance, low downlink geometry, its serving wireless access point is highly loaded while the neighbour wireless access point is low loaded then a Type 2B configuration may be used. Hence, the uplink power control algorithm may be configured by increasing the power target by a factor equal to a load imbalance between the serving and the neighbour wireless access point. The load imbalance is in an example at least $10 \log_{10}(60/10)=8$ dB. The above value is higher than the downlink geometry, which in the specific example is low and typically for low performing wireless device may be in the range of −5 dB to 2 dB. So the reason for selecting a Type 2B configuration is that it will boost the power target of the specific wireless device, thus increasing its transmit power and improving its link performance. This in turn will reduce cell utilisation of the serving wireless access point, leading to a better overall system performance.

The above set of basic conditions can be complemented with a set of secondary conditions. One example of a secondary condition is the wireless device battery life. Configuring uplink power control requires sometimes further increase in the transmit power. Moreover, multi-cell based power control configurations require further signalling and more processing power, especially in cases where the method is implemented at the wireless device side. The above may lead to battery drainage, thus uplink power control configuration may take into account the available wireless device battery level. For example, if the wireless device battery level is too low then a configuration which does not require excessive transmit power or more processing can be selected. The wireless access point may determine the wireless device battery life through an explicit request to the wireless device. Then the wireless device may report the current battery level by means of absolute or relative values. One example is that the wireless device signals the relative current level with respect to the maximum battery level. In another example, the wireless device may signal one out of L discrete power levels. If L=2, then a low and high power level can be considered in configuring the uplink power control.

Below follows a description when the method is performed by or implemented in the wireless access point.

In order to select the appropriate uplink power control algorithm, or configure the uplink power control algorithm, the wireless access point needs to receive related information. Information is required from the connected wireless device as well as neighbour wireless access point. For example, the wireless access point should receive measurements from the wireless device in order to determine its downlink geometry. In an example, the wireless access point receives reports from the wireless device of standardised downlink measurements and then calculates an average downlink geometry. In another example, the wireless device calculates an average downlink geometry and then reports the value (or any geometry level) to the wireless access point. The measurements may be done autonomously by the wireless device or requested from the wireless access point. Moreover, the reporting of the relevant information may be done autonomously by the wireless device or requested by the wireless access point.

Moreover, the wireless access point might have to receive information from other neighbour wireless access points, regarding their traffic load or average radio resource utilisation. The wireless device might signal to the wireless access point, the cell IDs of the wireless access points from which the load information is needed. For example, through RSRP measurements, the wireless device may determine which neighbour wireless access points are going to be disturbed by any future uplink transmissions. Reciprocity of the channel here may be used in case of Time Division Duplex, TDD, systems, or a frequency correction factor may be used in case of Frequency Division Duplex, FDD, systems. In an example, the wireless device may compare the RSRP of each wireless access point with a predetermined threshold and then, the ID of the wireless access point that are above that threshold can be signalled to the connected wireless access point. The selection of the neighbour wireless access points may be done in a periodic or aperiodic way. For example, the wireless access point might send a signal to the wireless device in order to measure RSRPs and/or report the cell IDs that are of interest. In another example, through regular reception of the downlink measurements from the wireless device, the wireless access point might be able to define the cell IDs that it should communicate with and request their average resource utilisation. In yet another example, the wireless device may assess a number of criteria (for e.g. its downlink geometry) and then based on the exemplary tables 1-5, may define if any information exchange between its serving wireless access point and its neighbour wireless access points is required. In that case, the wireless device might send a signal to the wireless access point and trigger the information exchange (i.e. average utilisation request).

Once the wireless access point has received all relevant information, it may assess a number of criteria as described above for the set of basic criteria and for the set of secondary criteria. The wireless access point may still be able to select an appropriate configuration even though not all criteria are available, hence make its selection on a subset of the aforementioned criteria. For example, communication between the serving wireless access point and the neighbour ones might not be possible. Moreover, the wireless access point may be able to select an appropriate configuration based on the combination of all aforementioned criteria, as it was shown above. The wireless access point may determine the uplink power control configuration whenever an uplink transmission is about to occur. Moreover, the wireless access point may be able to adapt the uplink power control configuration/selection if a criterion has changed. In addition, if the computation burden of assessing the criteria is to be minimised, the wireless access point may perform the above process periodically with a fixed or dynamic period time. For example, the period can change dynamically following the wireless device traffic pattern and requests for uplink scheduling.

After the wireless access point has selected the uplink power control algorithm, or configured the uplink power control algorithm, for a specific wireless device, the wireless access point signals the relative information to the wireless device. The uplink power control assistance information might include already standardised parameters (such as the baseline power target $P_0$). Based on the selection or the configuration, the wireless access point may apply the corresponding correction factor to the baseline power target as described above. Then, the wireless access point may signal the power target to the wireless device. In another example, the wireless access point signals to the wireless device only the correction factor independently of the power target. If a Type 1 configuration is selected then no extra signalling is used. In this example, the wireless device might have the possibility to overwrite the proposed correction factor based on a set of locally available criteria. For example, the wireless device can use Table 5 and decide whether or not it will follow the wireless access point recommendation.

Moreover, the wireless access point might signal the selected configuration or any correction factor thereof to neighbour wireless access points. This information may be utilised by neighbour wireless access points on setting their own uplink power control algorithm configurations and monitoring potential interference levels. For example, if a wireless access point boosts the power target of all its connected wireless devices then this is an indication that possible high uplink interference will be produced by the connected wireless devices of that wireless access point. Moreover, the wireless access point might send statistics of the used configurations or correction factors of the baseline uplink power control algorithm. The statistics can be average values, or any other statistical parameter (e.g. median, any %-ile, etc.). These statistics can be used by SON, O&M, OSS etc.

Below follows a description when the method is performed by or implemented in the wireless device.

The wireless device may assess a number of criteria and based on that configure or select the uplink power control algorithm. The selection or configuration of the appropriate uplink power control algorithm may be based on a minimum set of basic conditions. By evaluating at least one from the set of available basic conditions, the wireless device may select or configure the uplink power control algorithm. The wireless device may then signal uplink power control assistance information to the wireless access point. The information may contain an index to the selected configuration, a correction factor to the baseline power target of the power control algorithm among others. The set of basic criteria may be enhanced with a set of secondary or additional criteria.

In order to perform the criteria assessment for selecting or configuring the uplink power control algorithm, the wireless device needs to receive relevant information from the serving wireless access point and perform measurements of neighbouring wireless access points. For example, the wireless device should receive information from the serving wireless access point regarding its radio resource utilisation as well as on radio resource utilisation of neighbour wireless access points (or cells). The wireless device based on its own criteria may trigger the wireless access point to send this information. For example, in case of a wireless device with a very low downlink geometry, then a request is sent to the wireless access point for acquiring the resource utilisation levels of the serving and neighbouring wireless access points. In another example, the wireless access point may send this information proactively. Moreover the wireless device should perform measurements on neighbouring wireless access points. The measurements may comprise standardised Reference Signal Receive Power, RSRP, Reference Signal Receive Quality, RSRQ, and Received Signal Strength Indication, RSSI, type of mobility measurements. Through these measurements, the wireless device may determine its downlink geometry. These measurements may be performed as described in the standards or may be triggered by the uplink power control functionality.

Once the wireless device has received the relative to uplink power control algorithm information, the wireless device may perform an assessment of the basic and potentially secondary criteria as described above. The wireless device may select or configure the uplink power control algorithm based on a minimum set of criteria which may still be a subset of the basic conditions. For example, the radio resource utilisation of the neighbour wireless access points might not be available. In such case, the wireless device may still consider the radio resource utilisation of the serving wireless access point and then an assumption on the radio resource utilisation of the neighbouring wireless access points may be taken. In case of an aggressive uplink power control algorithm for example, a low load may be considered for the neighbour wireless access points which may lead to boosting the power targets for the own wireless access point. The wireless device should select or configure the uplink power control algorithm before an uplink transmission is about to occur. Moreover, the wireless device may be able to reselect or reconfigure the uplink power control algorithm when a criterion changes. In addition if the computation burden of assessing the criteria is to be minimised, the wireless device may perform the above process periodically with a fixed or dynamic period time. For example, the period may change dynamically following the wireless device traffic pattern and requests for uplink scheduling.

After the wireless device has selected or configured the uplink power control algorithm, there may be a number of alternatives of how to apply the corresponding correction factor to the uplink power control algorithm. In one example, the wireless device signals to the wireless access point the configuration index and a proposal on the corresponding correction factor to be applied on already standardised parameters (such as the power target $P_0$). The wireless access point may then follow or overwrite the wireless device recommendation and then signal back to the wireless device the uplink power control assistance information with or without the correction factor. In another example, the wireless device may not signal to the wireless access point the outcome of the uplink power control algorithm configuration decision. The wireless access point is unaware of any correction factor and signals only the standardized uplink power control assistance information. Then the wireless device autonomously adjusts the received power target with the selected uplink power control algorithm configuration.

In case the wireless access point is aware of the selected configuration or any correction factor, it may signal those values to neighbouring wireless access points, as described above. This information can be utilised by Self Organising Network, SON, Operation and Maintenance, O&M, Operational Support System, OSS etc.

Embodiments of a method for uplink power control a wireless device in a radio communication network will now be described with reference to FIGS. 1a-e. FIG. 1a is a flowchart of a method for uplink power control in a radio communication network according to an exemplifying embodiment.

FIG. 1a illustrates the method comprising obtaining 110 information pertaining to at least two of (a) radio resource utilisation of a serving wireless access point and at least one neighbouring wireless access point, (b) downlink geometry, and (c) uplink performance of the wireless device; and selecting 130 an uplink power control algorithm based on the obtained information.

The method may be performed by a wireless device and/or a wireless access point. The radio communication network may be a heterogeneous or a homogeneous communication network. Thus the wireless device may be located relatively close to the serving wireless access point or relatively far from the serving wireless access point. If the wireless device is located close to the serving wireless access point, relatively low uplink transmission power and/or downlink transmission power may be required for the wireless device and the wireless access point to communicate. Thus, neither uplink nor downlink transmission is likely to cause much interference in neighbouring cells or even at the edge of the cell of the serving access point.

However, in case the wireless device is located relatively close to the cell edge, or cell border, then relatively strong, or high, transmission power may be required both in uplink and in downlink in order for the wireless device and the serving wireless access point to communicate with each other. Further, being close to the cell edge of the serving wireless access point likely means that the wireless device is close to one or more cell edges of neighbouring wireless access points. Thus, if either or both of the wireless device and the serving wireless access point transmit with relatively high transmission power, they may more likely cause interference to the one or more neighbouring wireless access points. The amount of existing interference, or in other words the current interference situation, of the one or more neighbouring wireless access points may vary substantially.

Information pertaining to at least two of (a) radio resource utilisation of a serving wireless access point and at least one neighbouring wireless access point, (b) downlink geometry, and (c) uplink performance of the wireless device is obtained.

The radio resource utilisation of the serving wireless access point and at least one neighbouring wireless access point gives an indication whether both the serving wireless access point and the neighbouring wireless access point are heavily loaded, and thus probably subjected to an unfavourable interference situation, or if one of the serving wireless access point and the at least one neighbouring wireless access point is heavily loaded and thus there is a load imbalance between the wireless access points. The radio resource utilisation of the serving wireless access point and at the least one neighbouring wireless access point may further give an indication that none of the serving wireless access point and at the least one neighbouring wireless access point is heavily loaded. It shall be pointed out that by heavily loaded is meant a high level of radio resource utilisation. What may be considered a heavy or high load, i.e. a high level of radio resource utilisation, will be discussed in more detail below.

The downlink geometry has been defined above.

The uplink performance of the wireless device gives an indication of e.g. an interference situation for the wireless device. The uplink performance of the wireless device may indicate how many transmissions are successfully received by the serving wireless access point and how many retransmissions are requested by the serving wireless access point, which is a measure of the uplink performance of the wireless device with regard to a current and/or previous used uplink transmission power.

The method then comprises selecting an uplink power control algorithm based on the obtained information. Thus, instead of only determining an uplink transmission power according to e.g. the current uplink performance of the wireless device, several different factors are considered which also takes into account how the level of uplink transmission power may affect e.g. an interference situation for both the serving wireless access point and at the least one neighbouring wireless access point. Depending on the situation, the set of algorithms to select from may differ, as will be described in more detail below.

Selecting the uplink power control algorithm based on the obtained information may in some embodiments be performed by configuring or adapting one uplink power control algorithm based on the obtained information. In this case, the uplink power control algorithm may comprise factors corresponding to the different power control algorithms, which may be given more or less weight depending on the obtained information. This will be explained in more detail below.

The method may have several advantages. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The solution may be implemented as a proprietary feature. Still further, the solution may be part of Self Organising Network, SON, algorithms.

Selecting 130 the uplink power control algorithm based on the obtained information may comprise evaluating the obtained information against a corresponding threshold value.

The obtained information pertains to at least two of (a) radio resource utilisation of a serving wireless access point and at least one neighbouring wireless access point, (b) downlink geometry, and (c) uplink performance of the wireless device. The radio resource utilisation of the serving wireless access point and the at least one neighbouring wireless access point may vary substantially from low radio resource utilisation, medium radio resource utilisation to a high level of radio resource utilisation. Thus if the obtained information comprises information about the radio resource utilisation, e.g. a current level of radio resource utilisation, then the current level of radio resource utilisation may be evaluated against a threshold value for radio resource utilisation. It shall be pointed out that there may be more than one threshold. Merely as an example, the current level of the radio resource utilisation may be evaluated against two thresholds for determining if the current level of radio resource utilisation is low, medium or high. The definitions of low, medium and high may be defined by an operator and may be statically hard coded into a wireless access point or obtained by wireless access nodes from e.g. an Operation and Maintenance node. The different definitions of the level of radio resource utilisation, e.g. low, medium or high may alternatively be dynamically determined and obtained by wireless access nodes from the Operation and Maintenance node.

In the same or similar manner, the downlink geometry may be evaluated against one or more thresholds; and the uplink performance of the wireless device may be evaluated against one or more thresholds. The thresholds may be defined by an operator in the same manner as for the radio resource utilisation threshold(s).

Different factors may be more or less important to take into account when selecting the uplink power control algorithm based on the obtained information depending on a current situation for each factor. By evaluating the information pertaining to at least two of (a) radio resource utilisation of a serving wireless access point and at least one neighbouring wireless access point, (b) downlink geometry, and (c) uplink performance of the wireless device against respective thresholds, it may be determined which factors are of more importance and which factors are of less importance for the current situation.

The different uplink power algorithms may be based on, or take into account, different factors. For example, one uplink power algorithm may be based on multi-cell load, another one on single-cell pathloss and still another one on multi-cell downlink geometry.

As stated above, the different uplink power algorithms may be merged into one, and then selecting an uplink power algorithm may be implemented as configuring one uplink power algorithm. For example, the uplink power algorithm may take into account multi-cell load, single-cell pathloss and multi-cell downlink geometry, wherein the different factors may be given different weights, e.g. by means of multiplying each factor with the weight and the weight is a number between 0 and 1. Thus, equivalent to selecting an uplink power algorithm based on multi-cell load, multi-cell load is weighted with 1, or a value close to 1, and the single-cell pathloss and multi-cell downlink geometry is weighted with 0, or a value close to 0.

Figure 1B:
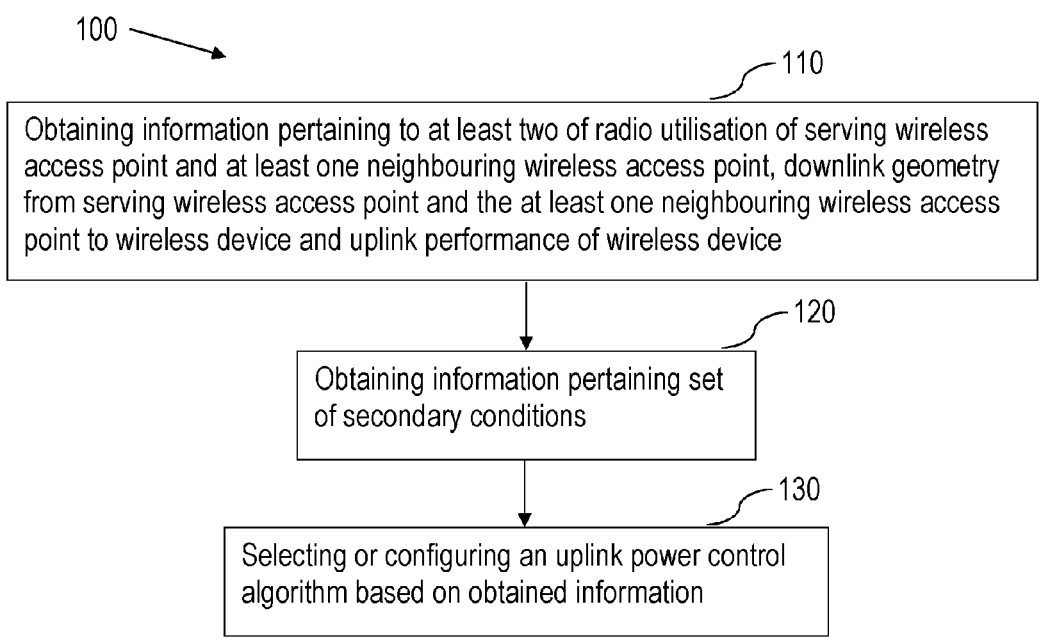
FIG. 1*b* is a flowchart of a method for uplink power control of a wireless device in a radio communication network according to still an exemplifying embodiment.

According to an embodiment, illustrated in FIG. 1b, the method further comprises obtaining 120 information pertaining to a set of secondary conditions comprising at least a battery level of the wireless device, wherein selecting 130 the uplink power control algorithm further is based also on the obtained information pertaining to the set of secondary conditions when evaluated against a corresponding threshold.

By obtaining information pertaining to the set of secondary conditions, the selection of uplink power algorithm may be based also on these set of secondary conditions. Equivalently, the configuration of the uplink power algorithm may be adapted such that the different weights are affected based on the obtained set of secondary conditions. Alternatively, the output of the selected uplink power algorithm may be adjusted afterwards based on the set of secondary conditions. For example, if the uplink power control algorithm, without taking the set of secondary conditions into account, results in a maximum uplink transmission power, then taking into account that e.g. the battery level of the wireless device is low may result in a lower than maximum uplink transmission power.

Below, four different embodiments are described relating to different situations with regards to (a) radio resource utilisation of a serving wireless access point and at least one neighbouring wireless access point, (b) downlink geometry, and (c) uplink performance of the wireless device. In the below embodiments, the information relating to two of (a), (b) and (c), is obtained. Based on the obtained information, an uplink power control algorithm is selected.

In a first embodiment, wherein when the radio resource utilisation of the serving wireless access point is above a resource utilisation threshold and the radio resource utilisation of the at least one neighbouring wireless access point is below the resource utilisation threshold, then an uplink power control algorithm based on multi-cell load is selected.

In such a situation, there is a load imbalance between the serving wireless access point and the at least one neighbouring wireless access point. The serving wireless access point is relatively highly loaded whereas the at least one neighbouring wireless access point experiences relatively low load.

Merely as an example, assume that the mean utilisation of the highly loaded serving cell is approximately 60%, while the mean utilisation of the neighbour cell is 10% then the load imbalance is at least $$10\log_{10}\left(\frac{60}{10}\right) = 8d.$$

The multi-cell load based uplink power algorithm may boost the power target of the wireless device, thus increasing the transmit power for the wireless device and improving the link performance. This in turn may reduce cell utilisation of the wireless access point, leading to a better overall system performance.

In a second embodiment, wherein when the radio resource utilisation of the serving wireless access point is below a resource utilisation threshold and the radio resource utilisation of the at least one neighbouring wireless access point is above the resource utilisation threshold, then an uplink power control algorithm based on single-cell pathloss is selected.

In such a situation, there is a load imbalance between the serving wireless access point and the at least one neighbouring wireless access point, but the situation is reversed compared to the load imbalance situation described just above. A single-cell pathloss based uplink power control is then selected in order to reduce the impact of uplink transmissions in the serving wireless access point to the loaded neighbour wireless access point and still maintain a good uplink performance of the wireless device in the serving wireless access point.

In such a case, the interference situation for the serving wireless access point may be less severe than the interference situation for the at least one neighbouring wireless access point.

In a third embodiment, wherein when the radio resource utilisation of the serving wireless access point and the radio resource utilisation of the at least one neighbouring wireless access point both are above or both are below the resource utilisation threshold, then an uplink power control algorithm based on single-cell pathloss is selected.

In this example, both the serving wireless access point and the at least one neighbouring wireless access point experience about the same load.

The single-cell pathloss based uplink power control algorithm may thus output an uplink transmission power that is adapted for the serving wireless access point, compensating at least partly for the pathloss between the serving wireless access point and the wireless device.

In a fourth embodiment, wherein when the downlink geometry is above a geometry threshold and when the uplink performance of the wireless device is above a performance threshold, then an uplink power control algorithm based multi-cell downlink geometry is selected.

The downlink geometry provides an indication of an experienced radio position of the wireless device with respect to the serving and the at least one neighbouring wireless access point. In other words, downlink geometry may give an indication if the wireless device is close to the serving wireless access point or far from the serving wireless access point. The further away from the wireless access point the wireless device is, the closer to the at least one neighbouring wireless access point the wireless device is. This is an indication that potential uplink data transmissions will not produce high interference to the neighbour cells. Hence, a high uplink power control target is desirable which can be obtained by utilizing the downlink geometry in the uplink power control algorithm.

Figure 1C:
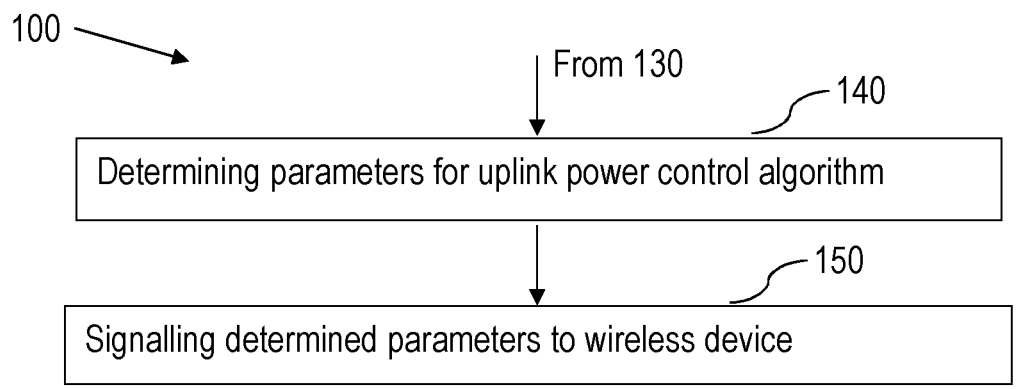
FIG. 1*c* is a flowchart of a method for uplink power control of a wireless device in a radio communication network according to yet an exemplifying embodiment.
Figure 1D:
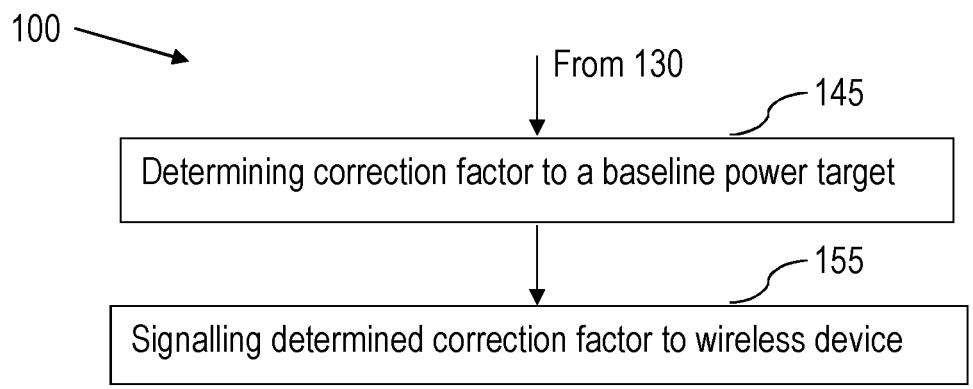
FIG. 1*d* is a flowchart of a method for uplink power control of a wireless device in a radio communication network according to an exemplifying embodiment.

In yet a further example, illustrated in FIGS. 1c and 1d, wherein the method is performed by the serving wireless access point, the method further comprises determining 140 parameters for the selected uplink power control algorithm to be used by the wireless device and signalling 150 the determined parameters to the wireless device; or determining 145 a correction factor to a baseline power target based on the selected uplink power control algorithm and signalling 155 the determined correction factor to the wireless device.

Once the uplink power control algorithm has been selected, parameters for the selected uplink power control algorithm are determined. The uplink power control algorithm may comprise a plurality of parameters, e.g. $P_O$ representing a received power target and $\alpha$ representing a pathloss compensation factor. Further, in the equivalence of one uplink power control algorithm comprising the different factors, i.e. multi-cell downlink geometry, single-cell pathloss and multi-cell load having different weights for the different factors, the weights may be determined.

Once the different parameters have been determined, they are signalled to the wireless device.

Alternatively to determining the parameters for the selected uplink power control algorithm, the correction factor to the baseline target based on the selected uplink power control algorithm may be determined. There may be a baseline target uplink transmission power, which is known both to the wireless access points and the wireless device. Then, the correction factor represents the deviation from the baseline target.

Once the correction factor has been determined, it is signalled to the wireless device.

Further, when the method is performed by the serving wireless access point, the method may further comprise signalling, to the wireless device, the selected uplink power control algorithm.

As well as signalling the determined parameters as described above, the actual selected uplink power control algorithm to be used is signalled to the wireless device. It is assumed that the wireless device has the different algorithms stored in a memory, e.g. hard coded into the wireless device or stored in a Subscriber Identity Module, SIM, card used by the wireless device. Thus, signalling the selected uplink power control algorithm means signalling an indication of which uplink power algorithm to use. Then the wireless device is provided with both which uplink power algorithm to use and which parameters to use with it.

Still further, when the method is performed by the serving wireless access point, the method may further comprise signalling, to the at least one neighbouring wireless access point, the selected uplink power control algorithm to be used by the wireless device.

By signalling, to the at least one neighbouring wireless access point, the selected uplink power control algorithm to be used by the wireless device, the wireless access points may coordinate between each other to optimise e.g. the interference situation. When the serving wireless access points informs the at least one neighbouring wireless access point about the selected uplink power control algorithm to be used by the wireless device, the at least one neighbouring wireless access point may be enabled to foresee how the wireless device may possibly affect the at least one neighbouring wireless access point. This may further enable the at least one neighbouring wireless access point to subsequently select an uplink power control algorithm for other wireless devices served by the at least one neighbouring wireless access point at least partly based on the uplink power control algorithm selected by the serving wireless access point.

The serving wireless access point may also send statistics of the selected, or configured, uplink power control algorithm. This may be done less often than each time when uplink power control algorithm is selected.

In an example, when the method is performed by the wireless device, obtaining the information pertaining to radio resource utilisation of the serving wireless access point and at least one neighbouring wireless access point may comprise receiving the information from the wireless access point(s).

When the method is performed by the wireless device, it needs to know the radio resource utilisation of the serving wireless access point and the at least one neighbouring wireless access point. In case the wireless access points are employed in e.g. an LTE based communication network, the wireless access points may communicate with each other by means of the X2-interface, thus the serving wireless access point may provide all the necessary information itself to the wireless device. In other communication networks, the serving wireless access point may receive information pertaining to resource utilisation of the at least one neighbouring wireless access point from e.g. a Base Station Controller or a Radio Network Controller. However, the wireless device may also receive the radio resource utilisation information from each neighbouring wireless access point separately.

The wireless device may receive the information from the wireless access point(s) either autonomously or by requesting the information.

Alternatively, the wireless device may determine the information as described above by measuring pilot signals and/or reference signals broadcasted from the at least one neighbouring wireless access point and the serving wireless access point.

Figure 1E:
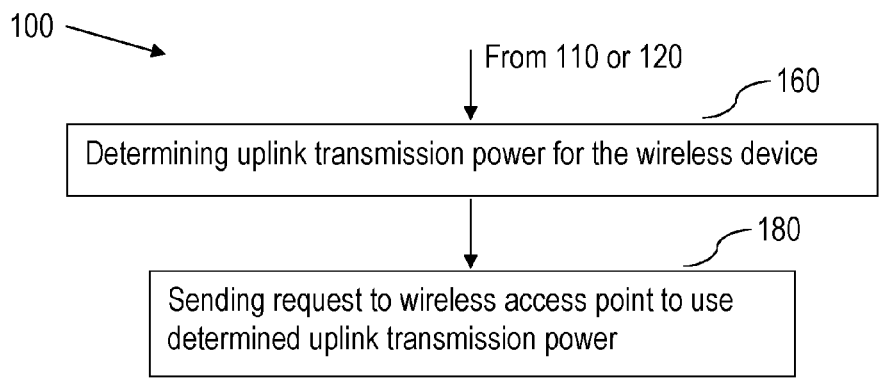
FIG. 1*e* is a flowchart of a method for uplink power control of a wireless device in a radio communication network according to yet a further exemplifying embodiment.

In still an example, illustrated in FIG. 1e, when the method is performed by the wireless device, the method may further comprise sending 180 an indication of a recommended uplink power control algorithm to the serving wireless access point.

In many communication networks, the final decision regarding uplink transmission power is up to the wireless access point. Thus, the wireless device may select an uplink power control algorithm that the wireless device would like to use, but since it is up to the wireless access point, the wireless device may only send an indication of a recommended uplink power control algorithm to the serving wireless access point. Then the wireless access point may agree and let the wireless device use the selected and recommended uplink power control to determine an uplink transmission power, or the wireless access point may overrule the recommendation and instead select another uplink power control algorithm to be used by the wireless device to determine an uplink transmission power.

The method described above thus takes into account a plurality factors, or metrics, when selecting, or configuring, the uplink power algorithm.

Embodiments herein also relate to an apparatus adapted for uplink power control of a wireless device in a radio communication network. The apparatus has the same objects, technical features and advantages as the method performed by the apparatus. The apparatus will only be described in brief in order to avoid unnecessary repetition, with reference to FIG. 3.

Figure 3:
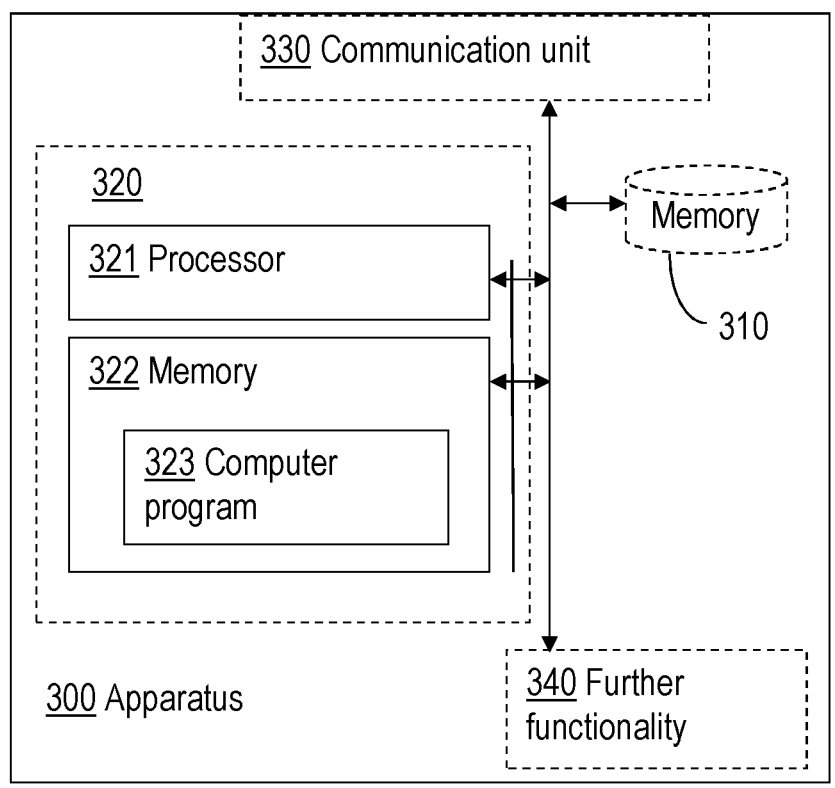
FIG. 3 is a block diagram of an apparatus adapted for uplink power control of a wireless device in a radio communication network according to an exemplifying embodiment.

FIG. 3 is a block diagram of an apparatus adapted for uplink power control of a wireless device in a radio communication network according to an exemplifying embodiment.

FIG. 3 illustrates the apparatus 300 comprising a processor 321 and a memory 322, the memory comprising instructions which when executed by the processor causes the apparatus 300 to: obtain information pertaining to at least two of (a) radio resource utilisation of a serving wireless access point and at least one neighbouring wireless access point, (b) downlink geometry, and (c) uplink performance of the wireless device; and to select an uplink power control algorithm based on the obtained information.

The apparatus has the same possible advantages as the method performed by the apparatus. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The impact on the current LTE standards is minimal or even none. The solution may be implemented as a proprietary feature. Still further, the solution may be part of SON algorithms.

According to an embodiment, the memory 322 further comprises instructions which when executed by the processor 321 causes the apparatus 300 to select the uplink power control algorithm based on the obtained information by evaluating the obtained information against a corresponding threshold value.

According to still an embodiment, the memory 322 further comprises instructions which when executed by the processor 321 causes the apparatus 300 to obtain information pertaining to a set of secondary conditions comprising at least a battery level of the wireless device, wherein selecting the uplink power control algorithm further is based also on the obtained information pertaining to the set of secondary conditions when evaluated against a corresponding threshold.

According to yet an embodiment, wherein when the radio resource utilisation of the serving wireless access point is above a resource utilisation threshold and the radio resource utilisation of the at least one neighbouring wireless access point is below the resource utilisation threshold, then an uplink power control algorithm based on multi-cell load is selected.

According to a further embodiment, wherein when the radio resource utilisation of the serving wireless access point is below a resource utilisation threshold and the radio resource utilisation of the at least one neighbouring wireless access point is above the resource utilisation threshold, then an uplink power control algorithm based on single-cell pathloss is selected.

According to still an embodiment, wherein when the radio resource utilisation of the serving wireless access point and the radio resource utilisation of the at least one neighbouring wireless access point both are above or both are below the resource utilisation threshold, then an uplink power control algorithm based on single-cell pathloss is selected.

According to another embodiment, wherein when the downlink geometry is above a geometry threshold and when the uplink performance of the wireless device is above a performance threshold, then an uplink power control algorithm based multi-cell downlink geometry is selected.

According to yet an embodiment, wherein the apparatus is the serving wireless access point, the memory 322 further comprises instructions which when executed by the processor 321 causes the apparatus 300 to determine parameters for the selected uplink power control algorithm to be used by the wireless device and to signal the determined parameters to the wireless device; or to determine a correction factor to a baseline power target based on the selected uplink power control algorithm and to signal the determined correction factor to the wireless device.

According to an embodiment, wherein the apparatus is the serving wireless access point, the memory 322 further comprises instructions which when executed by the processor 321 causes the apparatus 300 to signal, to the wireless device, the selected uplink power control algorithm.

According to yet an embodiment, wherein the apparatus is the serving wireless access point, the memory 322 further comprises instructions which when executed by the processor 321 causes the apparatus 300 to signal, to the at least one neighbouring wireless access point, the selected uplink power control algorithm to be used by the wireless device.

According to still an embodiment, wherein the apparatus is the wireless device, the memory 322 further comprises instructions which when executed by the processor 321 causes the apparatus 300 to obtain the information pertaining to radio resource utilisation of the wireless access point and at least one neighbouring wireless access point comprises receiving the information from the wireless access point.

According to an embodiment, wherein the apparatus is the wireless device, the memory 322 further comprises instructions which when executed by the processor 321 causes the apparatus 300 to send an indication of a recommended uplink power control algorithm to the serving wireless access point.

Embodiments herein also relate to an apparatus for uplink power control of a wireless device in a radio communication network. The apparatus has the same objects, technical features and advantages as the method performed by the apparatus and the apparatus briefly described above with reference to FIG. 3. The apparatus for uplink power control of a wireless device in a radio communication network will thus only be described in brief and with reference to FIG. 4.

Figure 4:
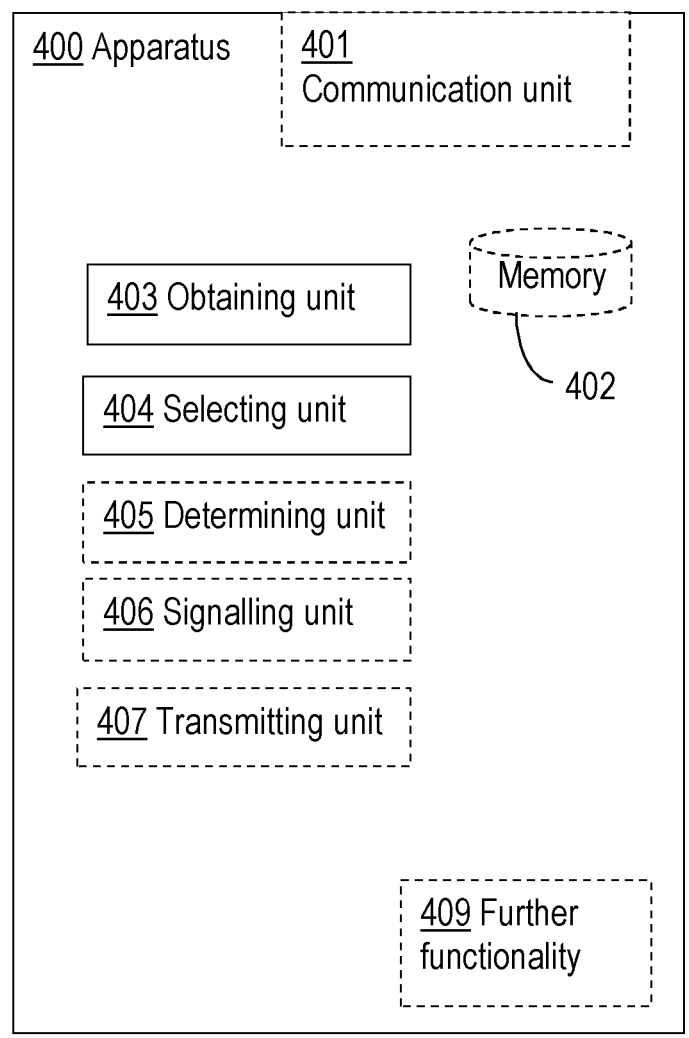
FIG. 4 is a block diagram of an apparatus for uplink power control of a wireless device in a radio communication network according to an exemplifying embodiment.

FIG. 4 is a block diagram of an apparatus for uplink power control of a wireless device in a radio communication network according to an exemplifying embodiment.

FIG. 4 illustrates the apparatus 400 comprising an obtaining unit 403 for obtaining information pertaining to at least two of (a) radio resource utilisation of a serving wireless access point and at least one neighbouring wireless access point, (b) downlink geometry, and (c) uplink performance of the wireless device. The apparatus also comprises a selecting unit 404 for selecting an uplink power control algorithm based on the obtained information.

The apparatus has the same possible advantages as the method performed by the apparatus and the apparatus describe above with reference to FIG. 3. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The solution may be implemented as a proprietary feature. Still further, the solution may be part of SON algorithms.

In FIGS. 3 and 4, apparatus 300, 400 is also illustrated comprising a communication unit 330 and 401. Through the communication unit, the apparatus 300, 400 is adapted to communicate with other nodes, devices and/or entities in the wireless communication network. The communication unit 330, 401 may comprise more than one receiving arrangement. For example, the receiving unit may be connected to both a wire and an antenna, by means of which the apparatus 300, 400 is enabled to communicate with other nodes and/or entities in the wireless communication network. Similarly, the communication unit 330, 401 may comprise more than one transmitting arrangement, which in turn are connected to both a wire and an antenna, by means of which the apparatus 300, 400 is enabled to communicate with other nodes and/or entities in the wireless communication network. The apparatus 300, 400 further comprises a memory 310, 322, 402 for storing data. Further, the apparatus 400 may comprise a control unit or processing unit (not shown) which in turn is connected to the different units 403-404. It shall be pointed out that this is merely an illustrative example and the apparatus 400 may comprise more, less or other units or modules which execute the functions of the apparatus 400 in the same manner as the units illustrated in FIG. 4.

It should be noted that FIG. 4 merely illustrates various functional units in the apparatus 400 in a logical sense. The functions in practice may be implemented using any suitable software and hardware means/circuits etc. Thus, the embodiments are generally not limited to the shown structures of the apparatus 400 and the functional units. Hence, the previously described exemplary embodiments may be realised in many ways. For example, one embodiment includes a computer-readable medium having instructions stored thereon that are executable by the control or processing unit for executing the method steps in the apparatus 400. The instructions executable by the computing system and stored on the computer-readable medium perform the method steps of the apparatus 400 as set forth in the claims.

Figure 5:
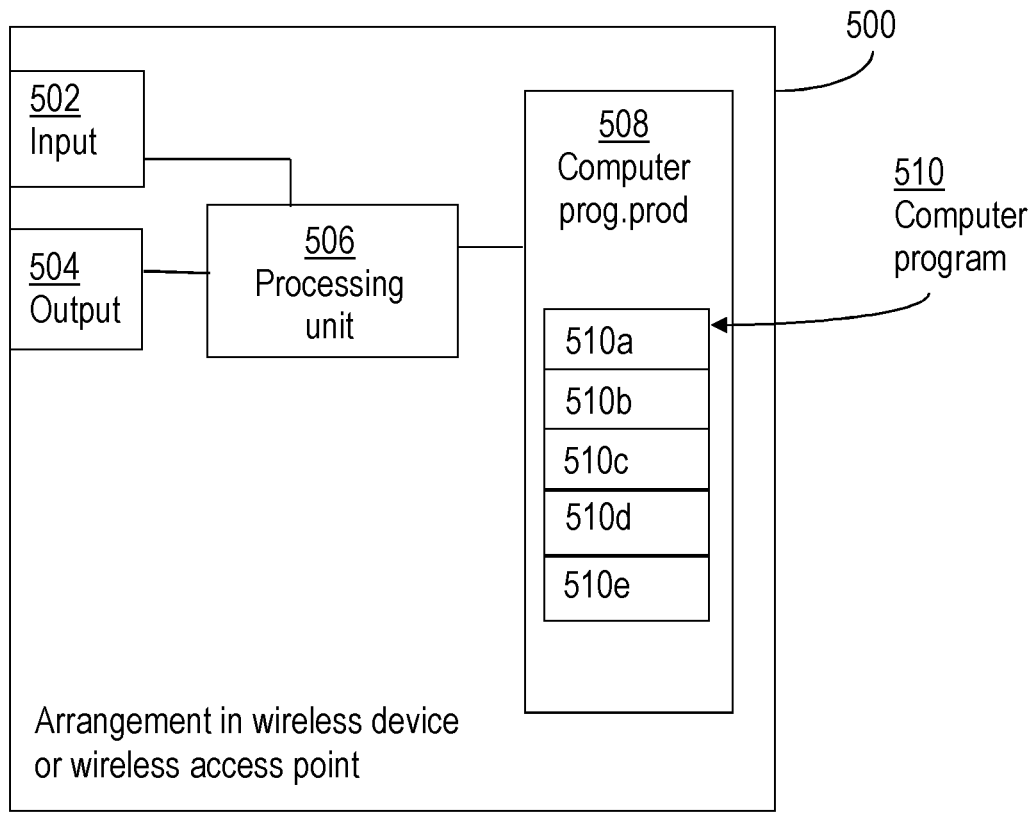
FIG. 5 is a block diagram of an arrangement in wireless device or wireless access point for uplink power control in a radio communication network according to an exemplifying embodiment.

FIG. 5 schematically shows an embodiment of an arrangement in an apparatus 500. Comprised in the apparatus 500 are here a processing unit 506, e.g. with a DSP (Digital Signal Processor). The processing unit 506 may be a single unit or a plurality of units to perform different actions of procedures described herein. The apparatus 500 may also comprise an input unit 502 for receiving signals from other entities, and an output unit 504 for providing signal(s) to other entities. The input unit and the output unit may be arranged as an integrated entity or as illustrated in the example of FIGS. 3 and 4, as one or more interfaces 330, 401.

Furthermore, the apparatus 500 comprises at least one computer program product 508 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the apparatus 500 causes the apparatus 500 to perform the actions e.g. of the procedure described earlier in conjunction with FIGS. 1a-1e.

The computer program 510 may be configured as a computer program code structured in computer program modules 510a-510e. Hence, in an exemplifying embodiment, the code means in the computer program of the apparatus 500 comprises an obtaining unit, or module, for obtaining information pertaining to at least two of (a) radio resource utilisation of a serving wireless access point and at least one neighbouring wireless access point, (b) downlink geometry, and (c) uplink performance of the wireless device. The code means in the computer program of the apparatus 500 further comprises a selecting unit, or module, for selecting an uplink power control algorithm based on the obtained information.

The computer program modules could essentially perform the actions of the flow illustrated in FIGS. 1a-1e, to emulate the apparatus 400. In other words, when the different computer program modules are executed in the processing unit 506, they may correspond to the units 403-404 of FIG. 4.

Although the code means in the respective embodiments disclosed above in conjunction with FIG. 4 are implemented as computer program modules which when executed in the respective processing unit causes the apparatus to perform the actions described above in the conjunction with figures mentioned above, at least one of the code means may in alternative embodiments be implemented at least partly as hardware circuits.

The processor may be a single CPU (Central processing unit), but could also comprise two or more processing units.

For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the apparatus.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method for uplink power control of a wireless device in a radio communication network, the method comprising:
    obtaining information pertaining to at least two of (a) radio resource utilization of a serving wireless access point and at least one neighboring wireless access point, (b) a downlink geometry of the wireless device, and (c) an uplink performance of the wireless device; and
    selecting an uplink power control algorithm for uplink power control of the wireless device, including selecting between a first type of uplink power control algorithm and a second type of uplink power control algorithm in dependence on evaluating the obtained information against one or more corresponding threshold values;
    wherein the first type of uplink power control algorithm relies on single-cell factors associated with the serving wireless access point and the second type of uplink power control algorithm relies on multi-cell factors associated with the serving wireless access point and the at least one neighboring wireless access point.

2. The method of claim 1, further comprising obtaining information pertaining to a set of secondary conditions comprising at least a battery level of the wireless device, and wherein selecting the uplink power control algorithm is further based on evaluating the obtained information pertaining to the set of secondary conditions against one or more corresponding threshold values.

3. The method of claim 1, wherein when, as determined from evaluating the obtained information against one or more corresponding threshold values, the downlink geometry of the wireless device is above a geometry threshold and the uplink performance of the wireless device is above a performance threshold, selecting the uplink power control algorithm comprises selecting an uplink power control algorithm that is of the second type and is based on a multi-cell downlink geometry.

4. The method of claim 1, wherein the method is performed by the serving wireless access point and further comprises: determining parameters for the selected uplink power control algorithm to be used by the wireless device, and signaling the determined parameters to the wireless device; or determining a correction factor to a baseline power target based on the selected uplink power control algorithm and signaling the determined correction factor to the wireless device.

5. The method of claim 1, wherein the method is performed by the serving wireless access point and the method further comprises signaling, to the wireless device, the selected uplink power control algorithm.

6. The method of claim 1, wherein the method is performed by the serving wireless access point and further comprises signaling, to the at least one neighboring wireless access point, the selected uplink power control algorithm to be used by the wireless device.

7. The method of claim 1, wherein the method is performed by the wireless device, and wherein obtaining the information pertaining to radio resource utilization of the wireless access point and at least one neighboring wireless access point comprises receiving the information from the wireless access point.

8. The method of claim 1, wherein the method is performed by the wireless device and further comprises sending an indication of the selected uplink power control algorithm as a recommended uplink power control algorithm to the serving wireless access point.

9. An apparatus configured for uplink power control of a wireless device in a radio communication network, the apparatus comprising:
   communication circuitry configured for communicating with the wireless device or with one or more nodes in the radio communication network; and
   processing circuitry configured to:
      obtain information pertaining to at least two of (a) radio resource utilization of a serving wireless access point and at least one neighboring wireless access point, (b) a downlink geometry of the wireless device, and (c) an uplink performance of the wireless device; and
      select an uplink power control algorithm for uplink power control of the wireless device, including selecting between a first type of uplink power control algorithm and a second type of uplink power control algorithm in dependence on evaluating the obtained information against one or more corresponding threshold values;
      wherein the first type of uplink power control algorithm relies on single-cell factors associated with the serving wireless access point and the second type of uplink power control algorithm relies on multi-cell factors associated with the serving wireless access point and the at least one neighboring wireless access point.

10. The apparatus of claim 9, wherein the processing circuitry is configured to obtain information pertaining to a set of secondary conditions comprising at least a battery level of the wireless device, and to select the uplink power control algorithm further based on evaluating the obtained information pertaining to the set of secondary conditions against one or more corresponding threshold values.

11. The apparatus of claim 9, wherein the processing circuitry is configured to select an uplink power control algorithm that is of the second type and is based on a multi-cell downlink geometry, based on determining that the downlink geometry of the wireless device is above a geometry threshold and that the uplink performance of the wireless device is above a performance threshold.

12. The apparatus of claim 9, wherein the apparatus is configured to operate as the serving wireless access point and the processing circuitry is configured to signal, to the at least one neighboring wireless access point, the selected uplink power control algorithm to be used by the wireless device.

13. The apparatus of claim 9, wherein the apparatus is configured to operate as the wireless device and wherein the processing circuity is configured to obtain the information pertaining to radio resource utilization of the wireless access point and at least one neighboring wireless access point, based on receiving the information from the wireless access point.

14. The apparatus of claim 9, wherein the apparatus is configured to operate as the wireless device, and wherein the processing circuitry is configured to send an indication of the selected uplink power control algorithm to the serving wireless access point, as a recommended uplink power control algorithm.

15. The method of claim 1, wherein the first type of uplink power control algorithm includes a single-cell path loss algorithm, and the second type of uplink power control algorithm includes a multi-cell loading algorithm, and wherein the obtained information includes a first load level indicating the level of radio resource utilization at the serving wireless access point and a second load level indicating the level of radio resource utilization at the at least one neighboring wireless access point.

16. The method of claim 15, wherein selecting the uplink power control algorithm for uplink power control of the wireless devices comprises, when the downlink geometry of the wireless device is below a defined geometry threshold and the uplink performance of the wireless device is below a defined performance threshold:
   selecting the single-cell path loss algorithm when any of the following conditions apply: the first load level is deemed low, or the second load level is deemed high, or the first load level is deemed medium while the second load level is deemed medium or high, or the first and second load levels are deemed high; and
   selecting the multi-cell loading algorithm when any of the following conditions apply: the first load level is deemed medium while the second load level is deemed low, or the first load level is deemed high while the second load level is deemed low or medium.

17. The method of claim 15, wherein the second type of uplink power control algorithm further includes a multi-cell geometry algorithm, and wherein selecting the uplink power control algorithm for uplink power control of the wireless device comprises, when the downlink geometry of the wireless device is above a defined geometry threshold and the uplink performance of the wireless device is below a defined performance threshold:
   selecting the single-cell path loss algorithm when the first and second load levels are deemed equal;
   selecting the multi-cell loading algorithm when any of the following conditions apply: the first load level is deemed medium or high while the second load level is deemed low, or the first load level is deemed high while the second load level is deemed medium; and selecting the multi-cell geometry algorithm when any of the following conditions apply: the first load level is deemed low while the second load level is deemed medium or high, or the first load level is deemed medium while the second load level is deemed high.

18. The method of claim 15, wherein the second type of uplink power control algorithm further includes a multi-cell geometry algorithm, and wherein selecting the uplink power control algorithm for uplink power control of the wireless device comprises, when the downlink geometry of the wireless device is above a defined geometry threshold and the uplink performance of the wireless device is above a defined performance threshold, selecting the multi-cell geometry algorithm for all defined levels of loading at the serving and at least one neighboring wireless access points, as indicated by the first and second load levels.

19. The method of claim 15, wherein selecting the uplink power control algorithm for uplink power control of the wireless device comprises, when the downlink geometry of the wireless device is below a defined geometry threshold and the uplink performance of the wireless device is above a defined performance threshold:
- selecting the single-cell path loss algorithm when any of the following conditions apply: the first load level is deemed low, or the first and second load levels are deemed equal, or the first load level is deemed medium while the second load level is deemed medium or high; and
- selecting the multi-cell loading algorithm when any of the following conditions apply: the first load level is deemed medium or high while the second load level is deemed low, or the first load level is deemed high while the second load level is deemed medium.

20. The method of claim 15, wherein selecting the uplink power control algorithm for the wireless device comprises selecting the single-cell path loss algorithm when a battery level of the wireless device is deemed low, and otherwise selecting the uplink power control algorithm in dependence on the first and second load levels.

* * * * *